(12) United States Patent
Singer et al.

(10) Patent No.: US 8,176,078 B1
(45) Date of Patent: May 8, 2012

(54) METHOD AND APPARATUS FOR DISTRIBUTING NETWORK SECURITY ADVISORY INFORMATION

(75) Inventors: Michael Singer, Basking Ridge, NJ (US); Keith Roden, Flemington, NJ (US); Stephen Roderick, Phillipsburg, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 273 days.

(21) Appl. No.: 11/314,598

(22) Filed: Dec. 21, 2005

(51) Int. Cl.
*G06F 17/30* (2006.01)
(52) U.S. Cl. ........................ 707/783; 707/784
(58) Field of Classification Search .............. 707/10
See application file for complete search history.

(56) References Cited

U.S. PATENT DOCUMENTS

| | | | |
|---|---|---|---|
| 5,903,845 A * | 5/1999 | Buhrmann et al. ........... 455/461 |
| 6,400,265 B1 * | 6/2002 | Saylor et al. ................. 340/531 |
| 6,745,230 B1 * | 6/2004 | Cao et al. ....................... 709/206 |
| 6,810,526 B1 * | 10/2004 | Menard et al. ................. 725/46 |
| 6,829,478 B1 * | 12/2004 | Layton et al. ................. 455/428 |
| 7,133,869 B2 * | 11/2006 | Bryan et al. ........................ 1/1 |
| 7,139,664 B2 * | 11/2006 | Kelly et al. ........................ 702/3 |
| 7,143,118 B2 * | 11/2006 | Eichstaedt et al. ............ 707/201 |
| 2002/0038430 A1 * | 3/2002 | Edwards et al. ............. 713/200 |
| 2004/0250107 A1 * | 12/2004 | Guo ............................... 713/200 |
| 2005/0005152 A1 * | 1/2005 | Singh et al. .................... 713/200 |
| 2005/0037733 A1 * | 2/2005 | Coleman et al. .............. 455/411 |
| 2006/0041436 A1 * | 2/2006 | Brodie et al. ...................... 705/1 |
| 2007/0113080 A1 * | 5/2007 | Shankar et al. ............... 713/166 |
| 2007/0192613 A1 * | 8/2007 | Amoroso et al. ............. 713/179 |

FOREIGN PATENT DOCUMENTS

CA 2475891 * 2/2005

* cited by examiner

*Primary Examiner* — Baoquoc To

(57) ABSTRACT

In one embodiment, the present invention is a method and apparatus for distributing network security advisory information. In one embodiment, each user creates a profile describing his or her preferences with regard to the receipt of security advisory information (e.g., types of security advisory information he or she wishes to receive, the channels over which he or she wishes to receive the security advisory information). Incoming security advisory information is then distributed in accordance with the user profiles.

20 Claims, 2 Drawing Sheets

US 8,176,078 B1

METHOD AND APPARATUS FOR DISTRIBUTING NETWORK SECURITY ADVISORY INFORMATION

FIELD OF THE INVENTION

The present invention relates generally to computing networks and relates more particularly to network threat management.

BACKGROUND OF THE INVENTION

Network security has become a critical issue for computing network users, including individual and business users. As quickly as security technology advances, would-be attackers (e.g., hackers) are finding more and more ways to expose and exploit network vulnerabilities. The time and cost associated with repairing damage done to an attacked network can be huge. It is thus desirable to detect potential vulnerabilities as early as possible, and ideally before they can be exploited, so as to limit or prevent the damage caused by attackers.

To ensure that user devices and systems are up-to-date with regards to security, many software providers make software "patches" available that, when installed, "fix" or eliminate vulnerabilities in a program. However, it is typically the user's responsibility to seek out and install these patches. Thus, a user may not be advised that a patch is available to repair a particular problem until it is too late to prevent exploitation of that problem.

Thus, there is a need in the art for a method and apparatus for distributing network security advisory information.

SUMMARY OF THE INVENTION

In one embodiment, the present invention is a method and apparatus for distributing network security advisory information. In one embodiment, each user creates a profile describing his or her preferences with regard to the receipt of security advisory information (e.g., types of security advisory information he or she wishes to receive, the channels over which he or she wishes to receive the security advisory information). Incoming security advisory information is then distributed in accordance with the user profiles.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention relates to the distribution of network security advisory information. Embodiments of the invention allow users (e.g., system administrators, customers, end users, etc.) to register or subscribe for selected types of security advisories and also provide for new ways of distributing security advisories. In this manner, relevant security advisories can be distributed to interested users in a timely fashion, maximizing the user's opportunity to repair any vulnerabilities before they can be exploited.

Within the context of the present invention, the term "security advisory information" or "advisory information" means an alert relating to a detected (but not necessarily exploited) network vulnerability (e.g., a flaw or feature of network software, network hardware, or a software/hardware combination that leaves the network open to a potential attack).

Figure 1:
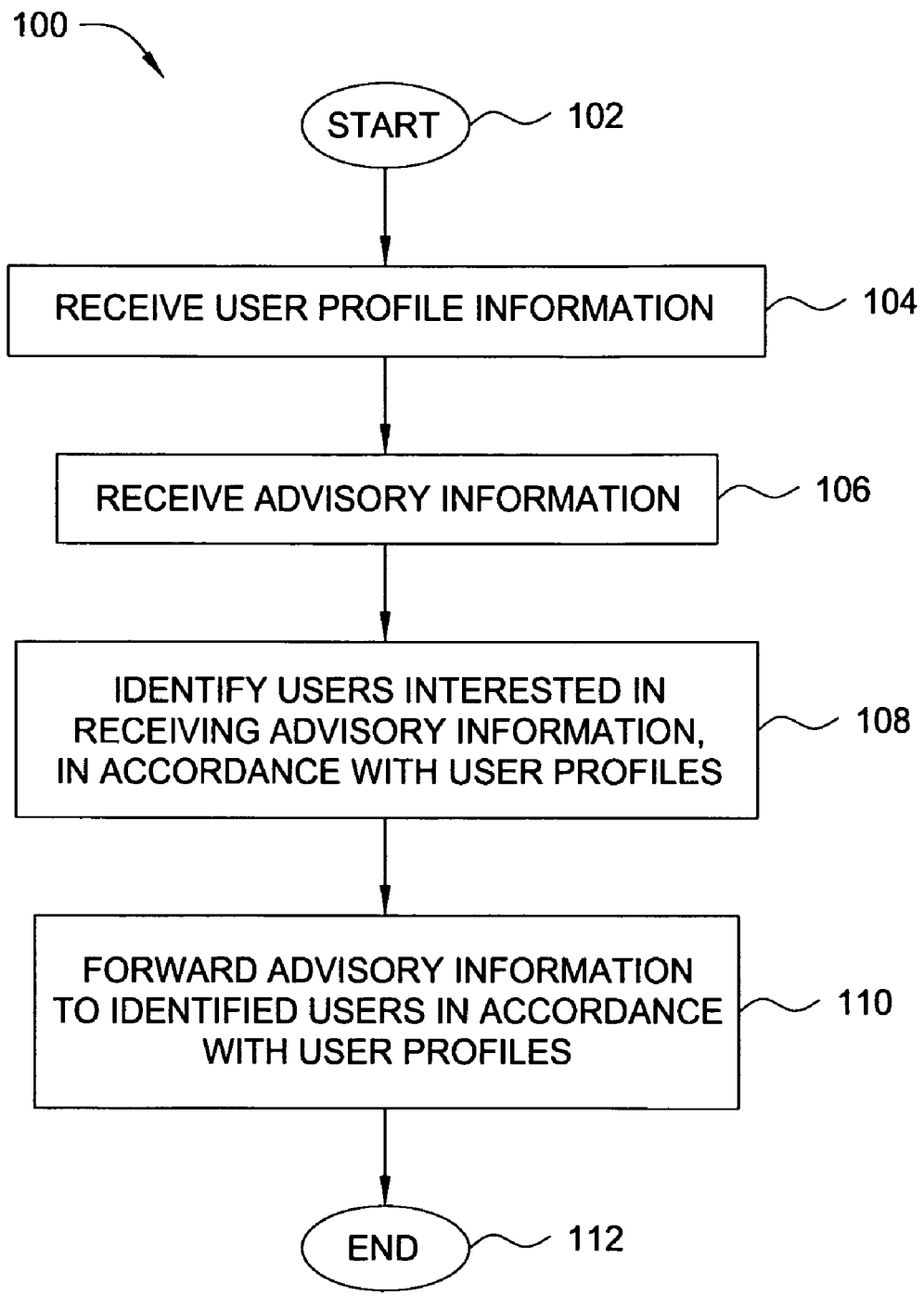
FIG. 1 is a flow diagram illustrating one embodiment of a method for distributing security advisory information, according to the present invention.

FIG. 1 is a flow diagram illustrating one embodiment of a method 100 for distributing security advisory information, according to the present invention. The method 100 may be implemented, for example, in conjunction with a threat management system for monitoring and responding to security threats in a computing network. For example, one such system that could be advantageously deployed in conjunction with the present invention is the Aurora threat management system, commercially available from AT&T Inc. of Bedminster, N.J. The method 100 allows the threat management system to distribute relevant security advisory information to users of the system in a timely manner.

The method 100 is initialized at step 102 and proceeds to step 104, where the method 100 receives user profile information. In one embodiment, user profile information includes a description of at least one of: the type or category of advisory information that the user wishes to receive, the frequency with which the user wishes to receive advisory information (e.g., immediately upon release, daily, weekly, monthly, quarterly, etc.) and the channel(s) over which the user wishes to receive advisory information. In one embodiment, the type or category of advisory information is specified by at least one of: subject matter (e.g., related programs, hardware, software categories, etc.) or urgency level (e.g., high, medium, low, etc.). In one embodiment, the channels over which advisory information can be received include at least one of: internal web site, external (e.g., customer-facing) web site and outbound text message (e.g., to an email address, to a text pager, to a cellular telephone, etc.). In one embodiment, user profile information is received via a hypertext markup language (HTML) interface presented to the user (e.g., via an internal or external web site).

In step 106, the method 100 receives advisory information. In one embodiment, the advisory information is received from a third party (e.g., a watch desk, a government group or agency, etc.). The advisory information relates to a detected vulnerability in the monitored network. This vulnerability may not necessarily have been exploited yet by an attacker, but represents a weakness of which an attacker could potentially take advantage. In one embodiment, the advisory information includes information relating to how to repair the detected vulnerability.

In step 108, the method 100 identifies the users that are interested in receiving advisory information of the type received in step 106, in accordance with the user profiles. The method 100 then proceeds to step 110 and forwards the received advisory information to the interested users, in accordance with the user profiles. That is, the method 100 forwards the advisory information to the interested users over the channels requested by the interested users (e.g., to user A via email, to user B via text pager and so on). The method 100 then terminates in step 112.

The method 100 thereby facilitates the distribution of security advisory information to potentially large groups of people in a relatively short time frame. By distributing security advisory information to users on-demand, critical information can reach users more quickly than it would by conventional methods (e.g., the users having to actively seek out the information, of which they might not even be aware of the availability). Users are enabled to customize the types of advisory information that they wish to receive, by selecting the desired types of advisory information in their user profiles. This helps users to easily identify relevant advisory information, because they do not have to sift through information that they did not request. Moreover, users can select the channels over which they receive the advisory information, for example so that the advisory information arrives via the quickest channel (e.g., say a user does not check his email frequently, but always has his text pager with him). Security advisory information is thereby distributed to the appropriate users in a manner that maximizes the users' ability to implement the appropriate corrective measures in a timely fashion (e.g., before a detected vulnerability can be exploited by an attacker).

Figure 2:
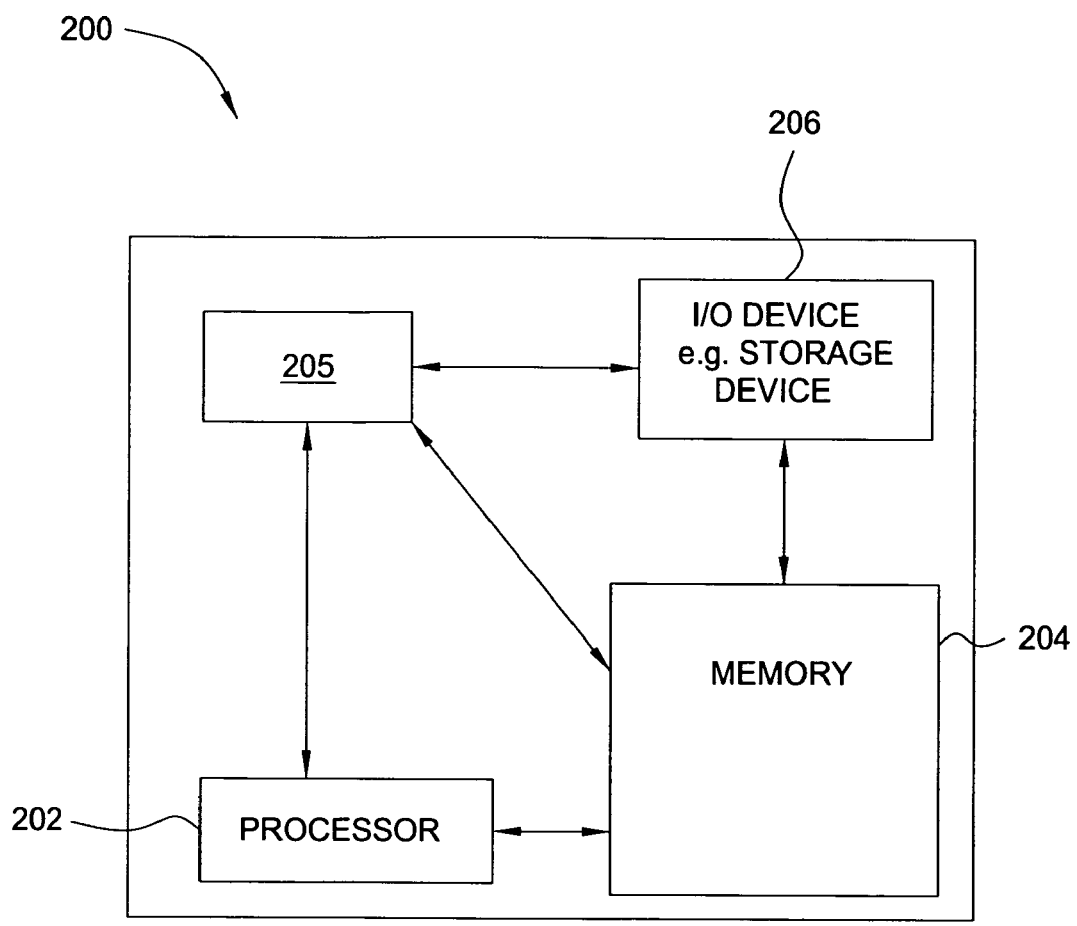
FIG. 2 is a high level block diagram of the advisory information distribution method that is implemented using a general purpose computing device.

FIG. 2 is a high level block diagram of the advisory information distribution method that is implemented using a general purpose computing device 200. In one embodiment, a general purpose computing device 200 comprises a processor 202, a memory 204, an advisory information distribution module 205 and various input/output (I/O) devices 206 such as a display, a keyboard, a mouse, a modem, and the like. In one embodiment, at least one I/O device is a storage device (e.g., a disk drive, an optical disk drive, a floppy disk drive). It should be understood that the advisory information distribution module 205 can be implemented as a physical device or subsystem that is coupled to a processor through a communication channel.

Alternatively, the advisory information distribution module 205 can be represented by one or more software applications (or even a combination of software and hardware, e.g., using Application Specific Integrated Circuits (ASIC)), where the software is loaded from a storage medium (e.g., I/O devices 206) and operated by the processor 202 in the memory 204 of the general purpose computing device 200. Thus, in one embodiment, the advisory information distribution module 205 for distributing security advisory information in a network described herein with reference to the preceding Figures can be stored on a computer readable medium or carrier (e.g., RAM, magnetic or optical drive or diskette, and the like).

Thus, the present invention represents a significant advancement in the field of computing networks. Users (e.g., system administrators, end users, etc.) are enabled to register or subscribe for selected types of security advisories and also to select the channels over which the selected security advisories are delivered. In this manner, relevant security advisories can be distributed to interested users in a timely fashion, maximizing the user's opportunity to repair any vulnerabilities before they can be exploited.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for distributing security advisory information in a network, the method comprising:
    receiving a plurality of user profiles at a threat management system, wherein the threat management system monitors for security threats in a computing network, each of the plurality of user profiles describing preferences of an associated user with regard to a receipt of third-party security advisory information, wherein the preferences comprise a channel over which the associated user wishes to receive the third-party security advisory information, wherein the channel comprises an internal web site, wherein the third-party security advisory information comprises an alert relating to a vulnerability of the computing network and information relating to how to repair a detected vulnerability in the computing network; and
    distributing via the threat management system the third-party security advisory information in accordance with the plurality of user profiles.

2. The method of claim 1, wherein the preferences further comprise a type of third-party security advisory information that the associated user wishes to receive.

3. The method of claim 2, wherein the type of third-party security advisory information is specified by an urgency level related to the third-party security advisory information.

4. The method of claim 1, wherein the plurality of user profiles is received via a hypertext markup language interface.

5. The method of claim 1, wherein the distributing comprises:
    receiving the third-party security advisory information;
    identifying identified users from the plurality of users who are interested in receiving the third-party security advisory information; and
    forwarding the third-party security advisory information to the identified users.

6. The method of claim 5, wherein the third-party security advisory information is received from a third party.

7. The method of claim 1, wherein the preferences further comprise a frequency with which the associated user wishes to receive the third-party security advisory information.

8. A computer readable medium containing an executable program for distributing security advisory information in a network, where the program performs:
    receiving a plurality of user profiles at a threat management system, wherein the threat management system monitors for security threats in a computing network, each of the plurality of user profiles describing preferences of an associated user with regard to a receipt of third-party security advisory information, wherein the preferences comprise a channel over which the associated user wishes to receive the third-party security advisory information, wherein the channel comprises an internal web site, wherein the third-party security advisory information comprises an alert relating to a vulnerability of the computing network and information relating to how to repair a detected vulnerability in the computing network; and
    distributing via the threat management system the third-party security advisory information in accordance with the plurality of user profiles.

9. The computer readable medium of claim 8, wherein the preferences further comprise a type of third-party security advisory information that the associated user wishes to receive.

10. The computer readable medium of claim 9, wherein the type of third-party security advisory information is specified by an urgency level related to the third-party security advisory information.

11. The computer readable medium of claim 8, wherein the plurality of user profiles is received via a hypertext markup language interface.

12. The computer readable medium of claim 8, wherein the distributing comprises:

receiving the third-party security advisory information;

identifying identified users from the plurality of users who are interested in receiving the third-party security advisory information; and forwarding the third-party security advisory information to the identified users.

13. The computer readable medium of claim 12, wherein the third-party security advisory information is received from a third party.

14. The computer readable medium of claim 8, wherein the preferences further comprise a frequency with which the associated user wishes to receive the third-party security advisory information.

15. An apparatus for distributing security advisory information in a network, the apparatus comprising:

a processor; and a computer-readable medium in communication with the processor, wherein the computer-readable medium having stored thereon a plurality of instructions, the plurality of instructions including instructions which, when executed by the processor, cause the processor to perform a method, comprising:

receiving a plurality of user profiles, each user profile describing preferences of an associated user with regard to a receipt of third-party security advisory information, wherein the preferences comprise a channel over which the associated user wishes to receive the third-party security advisory information, wherein the channel comprises an internal web site, wherein the third-party security advisory information comprises an alert relating to a vulnerability of a computing network, monitored by a threat management system for security threats in the computing network and information relating to how to repair a detected vulnerability in the computing network; and distributing the third-party security advisory information in accordance with the plurality of user profiles.

16. The apparatus of claim 15, wherein the preferences further comprise a type of third-party security advisory information that the associated user wishes to receive.

17. The apparatus of claim 16, wherein the type of third-party security advisory information is specified by an urgency level related to the third-party security advisory information.

18. The apparatus of claim 15, wherein the plurality of user profiles is received via a hypertext markup language interface.

19. The apparatus of claim 15, further comprising:

receiving the third-party security advisory information;

identifying identified users from the plurality of users who are interested in receiving the third-party security advisory information; and forwarding the third-party security advisory information to the identified users.

20. The apparatus of claim 15, wherein the preferences further comprise a frequency with which the associated user wishes to receive the third-party security advisory information.

* * * * *